Figure 1:
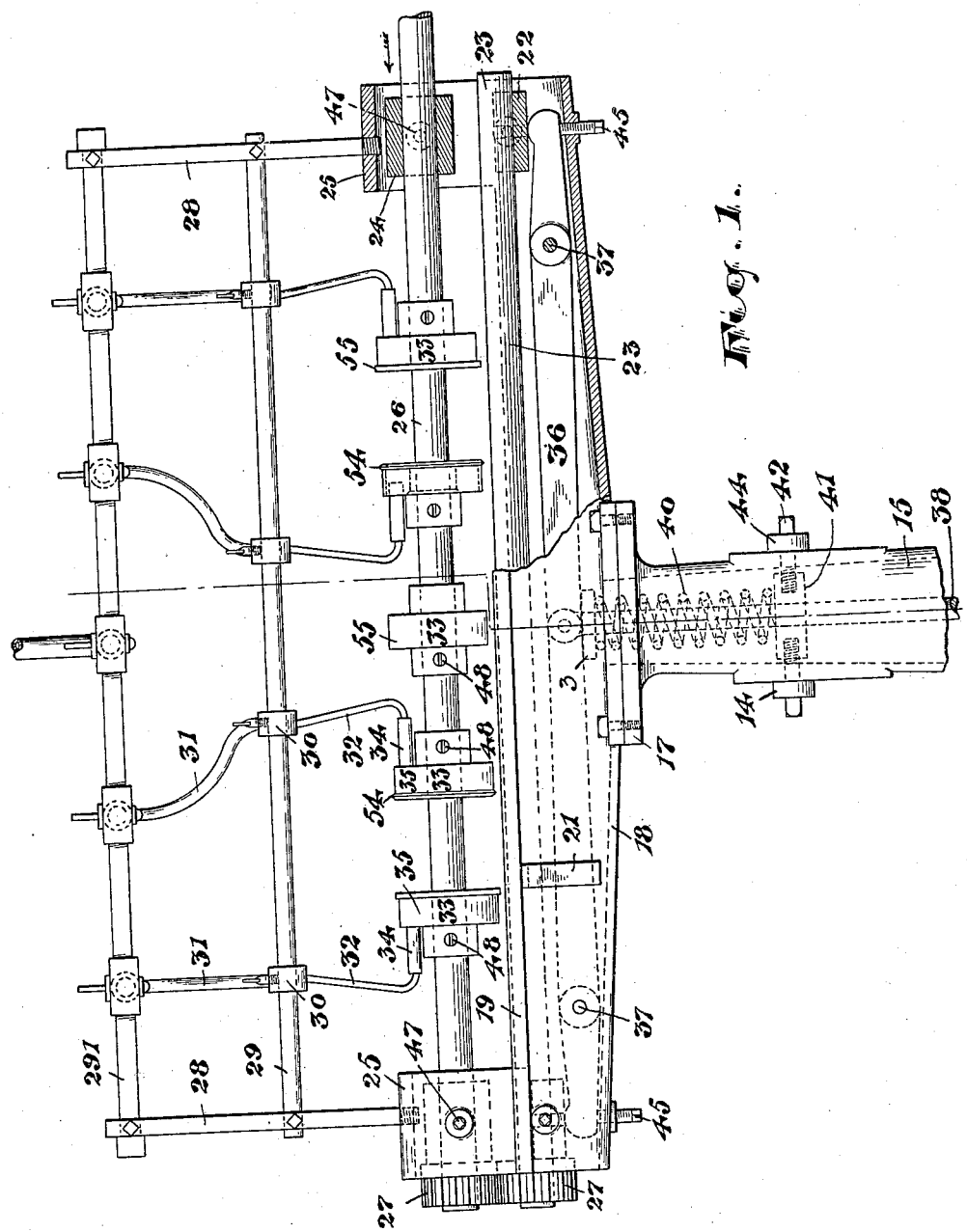

No. 887,721.

PATENTED MAY 12, 1908.

J. P. CLARK.

CREASING, SCORING, MARKING, AND CUTTING MACHINE.

APPLICATION FILED MAY 20, 1905.

5 SHEETS—SHEET 1.

WITNESSES:
Ralph Lancaster
Russell M. Everett

INVENTOR
James P. Clark,
BY
Charles H. Pell
ATTORNEY.

No. 887,721. PATENTED MAY 12, 1908.
J. P. CLARK.
CREASING, SCORING, MARKING, AND CUTTING MACHINE.
APPLICATION FILED MAY 20, 1905.

5 SHEETS—SHEET 2.

WITNESSES:
Ralph Lancaster
Russell M. Everett

INVENTOR:
James P. Clark
BY
Charles H. Pell,
ATTORNEY.

No. 887,721.

PATENTED MAY 12, 1908.

J. P. CLARK.
CREASING, SCORING, MARKING, AND CUTTING MACHINE.
APPLICATION FILED MAY 20, 1905.

5 SHEETS—SHEET 3.

WITNESSES:
Ralph Lancaster
Russell M. Everett

INVENTOR
James P. Clark.
BY
Charles H. Pell,
ATTORNEY.

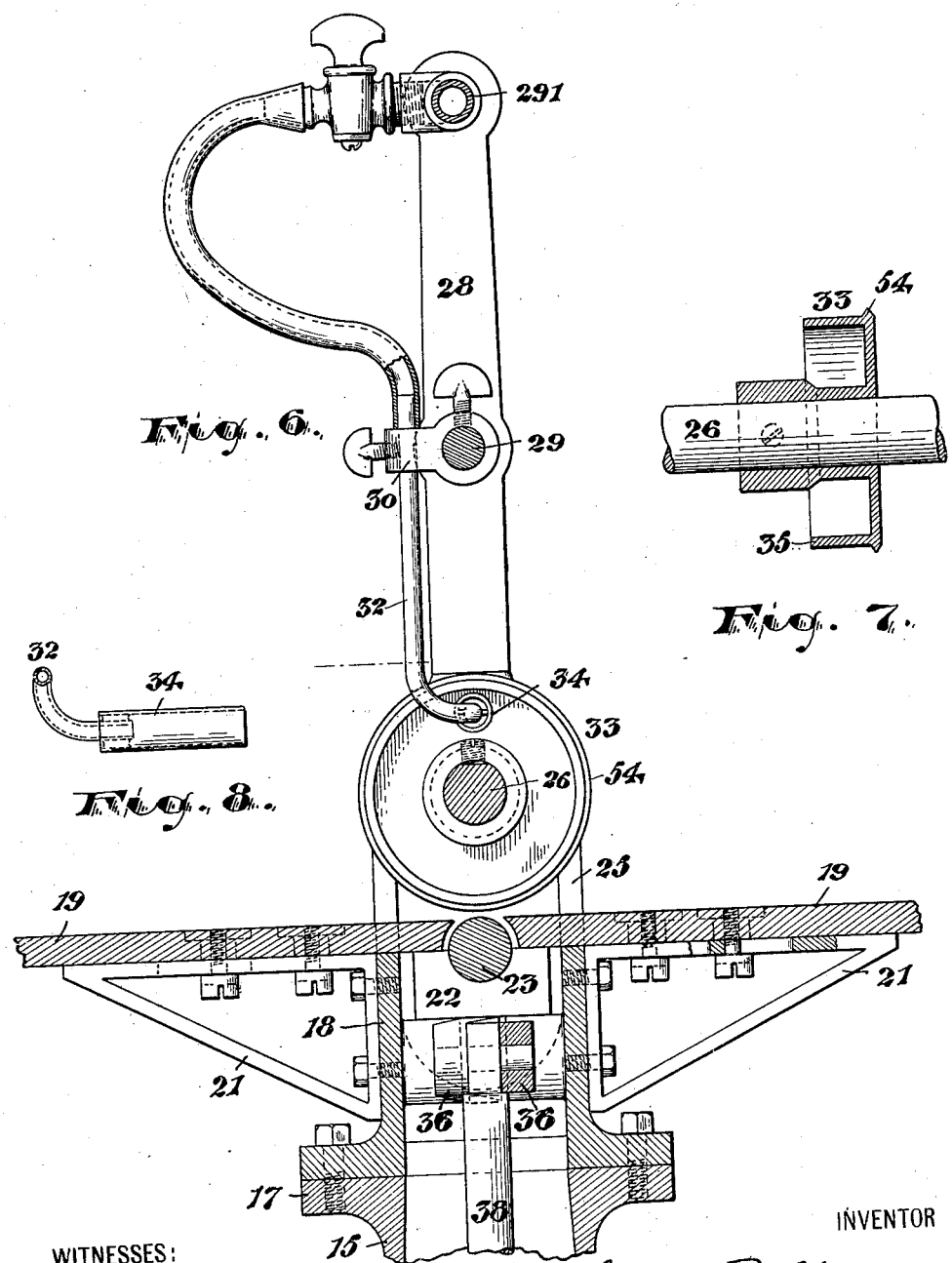

No. 887,721. PATENTED MAY 12, 1908.
J. P. CLARK.
CREASING, SCORING, MARKING, AND CUTTING MACHINE.
APPLICATION FILED MAY 20, 1905.

5 SHEETS—SHEET 5.

WITNESSES:
Ralph Lancaster
Russell M. Everett

INVENTOR
James P. Clark,
BY
Charles H. Pell,
ATTORNEY.

UNITED STATES PATENT OFFICE.

JAMES P. CLARK, OF NEWARK, NEW JERSEY, ASSIGNOR TO THE R. NEUMANN HARDWARE CO., A CORPORATION OF NEW JERSEY.

CREASING, SCORING, MARKING, AND CUTTING MACHINE.

No. 887,721.

Specification of Letters Patent.

Patented May 12, 1908.

Application filed May 20, 1905. Serial No. 261,466.

*To all whom it may concern:*

Be it known that I, JAMES P. CLARK, a citizen of the United States, residing at Newark, in the county of Essex and State of New Jersey, have invented certain new and useful Improvements in Creasing, Scoring, Marking, and Cutting Machines; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates more particularly to certain improvements in machines for creasing, scoring, marking and cutting leather, or sheets of other material, particularly in the manufacture of traveling bags, suit cases, etc., the objects of the present improvements being to secure a more perfect finish in the article scored or creased; to polish the surface of the scoring marks; to facilitate the work of interchanging the scoring, creasing, marking or cutting tools and of adjusting the same to properly locate the scoring marks at lines to enable the scoring tools or implements to be brought into action by means of the feet and thus to free the hands that they may be free to manipulate the sheets undergoing the scoring or marking operation, and to secure other advantages and results, some of which may be referred to hereinafter in connection with the description of the working parts.

The invention consists in the improved creasing, marking, cutting or scoring machine, and in the arrangements and combinations of parts of the same, all substantially as will be hereinafter set forth and finally embraced in the clauses of the claim.

Figures 2, 3:
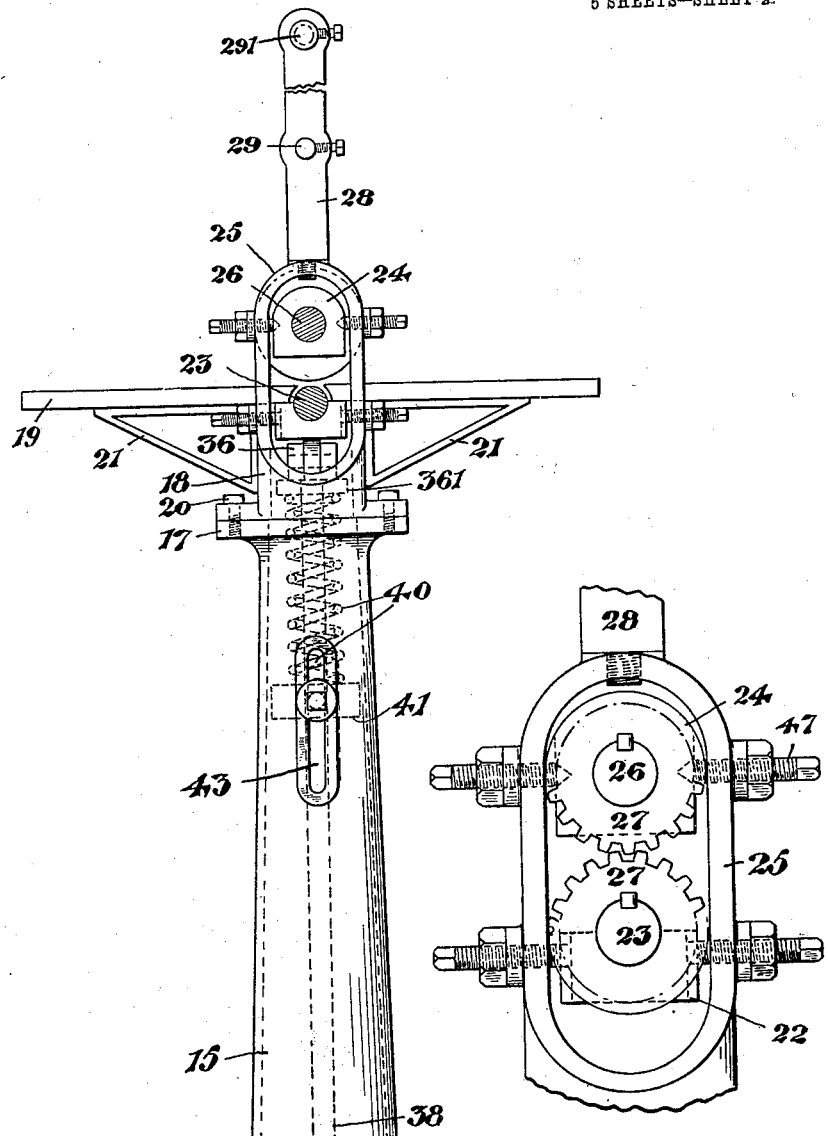
Figure 5:
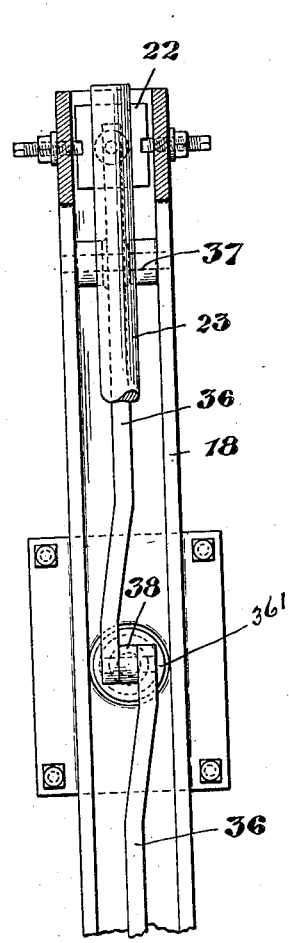
Figure 4:
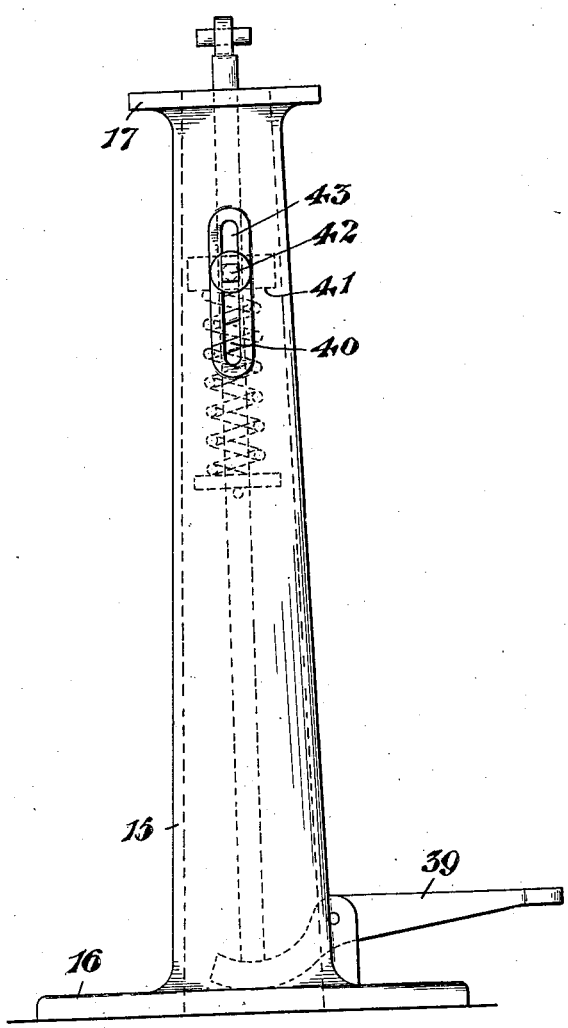
Figure 10:
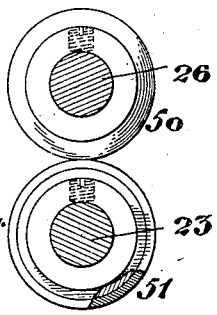
Figure 9:
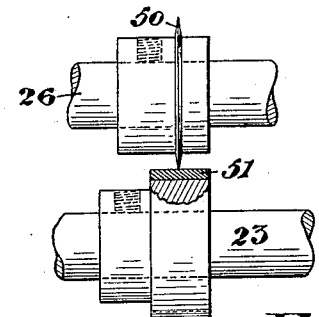
Figure 12:
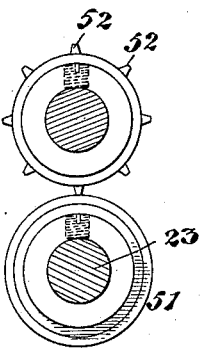
Figure 11:
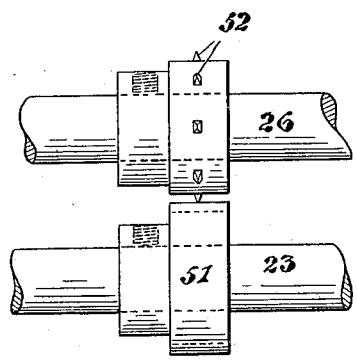
Figure 13:
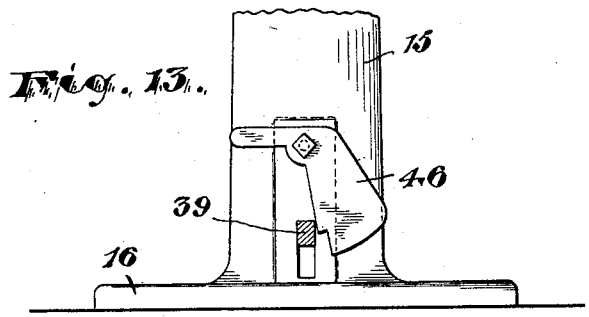

Referring to the accompanying drawings, in which like letters of reference indicate corresponding parts in each of the several figures, Figure 1 is a front elevation, partly in section, of my improved scoring or creasing machine; Fig. 2 is a side elevation of the same; Fig. 3 is a detail view on an enlarged scale, showing the parallel shafts and the bearings for the same; Fig. 4 is a detail view of a center post upon which the upper portions of the machine are supported; Fig. 5 is a detail plan, partly in section, of a portion of a horizontal box or closure secured to the top of said center post; Fig. 6 is a detail sectional view of the upper portion of the machine; Fig. 7 is a detail sectional view of a creasing tool, and Fig. 8 is a detail view of a heating jet for said tool; Fig. 9 is a detail view of a cutting implement adapted to be employed in connection with said machine, Fig. 10 is a side view of the same, Fig. 11 is a detail view of a marking implement, Fig. 12 is a side view of the same, and Fig. 13 is a detail view of a lock or keeper for holding the scoring, creasing, cutting, or marking implements in proper operative relation and thus relieve the feet from the labor of such duty or function.

In said drawings, 15 indicates a hollow center post comprising the base portion of the frame or bed of the machine which is flanged at its lower extremity to form a broad bearing 16, by which said post may be securely fastened upon a suitable flooring or foundation. The upper extremity of said post is also flanged as at 17, to receive a horizontal or transverse box or casing 18, upon which latter a table 19, is secured, the box or casing 18, being held upon the top of the post by means of bolts 20, or other suitable means.

Suitable brackets or braces 21, are arranged at opposite sides of the transverse box to properly hold the table in its horizontal position. At the opposite ends of the table, or of said box or casing, are sliding bearings 22, for a lower shaft 23, and above said bearings 22, are bearings 24, arranged in upwardly projecting end extensions 25, of the box 18, in which bearings 24, the tool or implement carrying shaft 26, is placed, the said shaft 26, lying parallel with and a little above the shaft 23. The shafts 23 and 26, are provided each at one end with a cog wheel 27, by means of which power is transmitted from one shaft to the other, and to one of said shafts is applied suitable motive means, not shown, which may be a power pulley of any suitable kind, if the machine is to be driven by a motor, or a hand crank, if the machine is to be operated by hand power alone.

The box extensions 25, may serve to support uprights 28, of a frame or rack having horizontal bars 29, and 291, the latter of which is a gas pipe and on which adjustable supports 30, for branch gas pipes 31, and jets 32, are arranged for heating suitable tools, disposed on the shaft 26. The said jets 32, are turned horizontally at their lower end as at 34, to enter within the annular flanges 35, of the said tools or implements or direct a flame of ignited gas against said tools within said annular flanges to heat said tools when necessary to secure the desired finish.

Within the transverse horizontal box or case 18, is arranged a pair of levers 36, 36, which extend from a point above the center post 15, oppositely to points immediately beneath the bearings 22, the said levers being fulcrumed intermediate of their ends as at 37. At their inner ends, the said levers are suitably connected to a common operating rod or bar 38, extending from said levers downward to a pedal or foot lever 39, arranged at the base of the center post 15. The connecting rod or bar 38, lying within the bar or post 15, is provided with a spring 40 adapted to raise said connecting rod and its connections when relieved of the pressure of the foot. The said connecting rod 38, extends through a block or bearing 41, which provides a bearing for the lower end of the spring, the said block having extensions 42, lying in slots 43, Fig. 2, in the opposite sides of the center post, the said extensions being provided with nuts 44, by means of which the said bearing can be adjustably fastened at any desired adjustment within the post 15. The spring 40, preferably bears against the under sides of the inner ends of the levers 36, or a washer 361, thereunder to throw the same upwards and the outer ends of said levers 36, are limited in their downward movements by stop pin-screws 45. By placing the foot upon the pedal or foot lever 39, the rod 38, is drawn downward against the pressure of the spring 40, and the outer end of the said levers 36, move upward against the bearings 22, throwing said bearings upward and the horizontal shaft 23, carried by said bearings against or in operative relation to the implements, or tools carried by the shafts 26. Should I desire to hold the said levers and bearings and the shaft 23, in such operative relation I can do so by means of the screws 45, or by means of a lock 46, shown in Fig. 13, adapted to be turned to the lock pedal 39, in any suitable manner. The cog wheels 27, are preferably of uniform size and thus the shafts connected thereby rotate at a uniform speed, but it will be noted that the implements on the upper shaft are larger in diameter than the opposing surface as the periphery of the lower shaft, and thus, as the implements revolve, they move at the points of engagements with the leather or material, more quickly than the said leather or material is fed forward by the lower shaft. Thus, especially in the scoring operation, the tools effect a polishing of the leather because of said tools sliding upon said leather.

In adjusting the tools upon the shaft 26, the latter is loosened in its bearings by turning the screws 47. The said shaft can then be moved longitudinally, preferably in the direction of the arrow in Fig. 1, to free the shaft from the bearing 24. The set screw 48, of the tools or implements may be then loosened and said implements can then be withdrawn from the said shaft for the purpose of interchange, or said tools may be adjusted on the shaft to effect the desired scoring, creasing, marking or cutting.

In the drawings 50, Figs. 9 and 10, indicates a cutting implement or tool adapted to be adjustably secured upon the shaft 26, and when said tool is employed, I may, under some conditions, apply to the lower shaft 23, an opposing collar 51, of soft metal against which the sharp blade may press without injury to the edge. In Fig. 11 and 12, a marking tool is shown applicable to the shaft 26. This tool being provided with punching points 52, is adapted to press into the leather or material and form indentations to guide the workman in marking the material in place. In Figs. 1 and 7, a creasing tool 54, is shown adapted to crease the leather or material so that the same can be easily bent and without rupture.

55 in Fig. 1, indicates scoring tools adapted to press the leather and polish the same for making ornamental score marks thereon. Other tools may be employed with good effect without departing from the scope of the invention.

In the creasing and scoring operation, the tools are heated by the flame from the gas jets as before described. Suitable guides, not shown, may be employed for directing the leather over the surface of the table.

In operating the device the leather or sheet of material is laid flat upon the table and underneath the shaft 26, with its tools properly adjusted. The foot of the operator is then pressed against the pedal 39, and the shaft 23, is forced upward so as to press the leather hard against the scoring or other implement. If the work to be performed is in considerable quantity and uniform, the shaft 23 may be locked in its elevated position, but if the work is of a limited quantity, or is of a varied nature, the pressure is accomplished by the foot alone. The power applied to the shaft 23, causes the said shaft to rotate and the tools thereon to likewise rotate and effect the desired scoring, creasing, cutting, or marking.

I am aware that various changes may be made in the detail construction of my machine without departing from the purposes or scope of the invention, and I do not wish to be understood as limiting myself by the positive descriptive terms hereinbefore employed excepting as the state of the art may require.

Having thus described the invention, what I claim as new is:—

1. A machine of the kind described, comprising a support, a fixed roll, tools on the roll, sliding bearings in the support, a roll arranged in the bearings, a gear on one end of each roll and in constant mesh to continuously drive the second roll from the first roll, manually operated means for raising the bearings to bring the rolls together, means for automatically separating the rolls when the manually operated means is released, and a lock for securing the rolls against automatic separation.

2. A machine of the kind described, comprising a hollow post, a horizontal part seated thereon, a table on the support, a fixed roll above said table, sliding bearings in the ends of the horizontal part, a roll in the bearings, gears on the rolls and in mesh for rotating them simultaneously, means for regulating the normal distance between the rolls, levers pivoted in the horizontal part and engaging the bearings on their outer ends, an operating rod in the post and pivoted to the inner ends of the levers, said post being manually operated to force the rolls together and regulate the pressure between them, a spring for forcing the rolls apart when the manual operation ceases, and a lock for preventing the spring return of the post.

3. A machine of the kind described, comprising a hollow post, a horizontal part thereon, a fixed roll above the horizontal part, a movable roll in sliding bearings below the fixed roll, a set of levers for raising the movable roll, a rod passing through the hollow post and connected on one end to the levers, a foot treadle on the post and pivoted to the rod, a spring encircling the rod and abutting at the top on the levers, a block in the hollow post and adapted to support the spring, the post having alined slots, extensions on the block and riding in the slots, and nuts on the extensions to adjustably secure the block in the post.

In testimony that I claim the foregoing, I have hereunto set my hand this seventeenth day of May, 1905.

JAMES P. CLARK.

Witnesses:
   CHARLES H. PELL,
   RUSSELL M. EVERETT.